June 23, 1970 D. S. OLIVER 3,517,206

APPARATUS AND METHOD FOR OPTICAL READ-OUT OF INTERNAL ELECTRIC FIELD

Filed April 8, 1968 3 Sheets-Sheet 1

DONALD S. OLIVER
INVENTOR.

BY Joseph S. Iandiorio

ATTORNEY.

DONALD S. OLIVER
INVENTOR.

BY Joseph S. Iandiorio
ATTORNEY.

DONALD S. OLIVER
INVENTOR.

BY Joseph S. Iandiorio
ATTORNEY.

3,517,206

APPARATUS AND METHOD FOR OPTICAL READ-OUT OF INTERNAL ELECTRIC FIELD

Donald Sears Oliver, West Acton, Mass., assignor to Itek Corporation, Lexington, Mass., a corporation of Delaware Filed Apr. 8, 1968, Ser. No. 721,913
Int. Cl. G02f *1/26*
U.S. Cl. 250—225 27 Claims

ABSTRACT OF THE DISCLOSURE

Apparatus is disclosed for reading out information stored in the form of a pattern in a semi-conductor medium by means of an internal electric field by exposing to radiation an electro-optic medium, exhibiting a characteristic that varies with variations of an applied electric field, associated with the semi-conductor medium, to modulate as a function of the internal electric field of the semi-conductor medium radiation transmitted by it, and detecting the modulation of the radiation, imposed by the electro-optic medium, representative of the information pattern stored in the semi-conductor medium.

CHARACTERIZATION OF INVENTION

The invention is characterized in information retrieval apparatus for reading out information stored in the form of a pattern in a semi-conductor medium by means of an internal electric field comprising an electro-optic medium, exhibiting a characteristic that varies with variations of an applied electric field, associated with the semi-conductor medium for modulating as a function of the internal electric field of the semi-conductor medium radiation transmitted by the electro-optic medium, means for exposing the electro-optic medium to radiation, and means for detecting the modulation of the radiation, imposed by the electro-optic medium, representative of the information pattern stored in the semi-conductor medium.

BACKGROUND OF INVENTION

This invention relates to retrieval of information stored in the form of a pattern in a semi-conductor medium by means of an internal electric field, and more particularly to retrieval of such information by applying that internal electric field to an electro-optic medium and detecting the modulation of radiation transmitted by that electro-optic medium as a function of the field.

Information may be stored in semi-conductor materials by projecting a pattern of radiation onto the semi-conductor surface to establish an internal electric field in the semi-conductor which corresponds to the intensity variation of the radiation pattern incident on it. There are many important advantages in this type of information storage such as small size, and the ability to function without moving parts as required by most present day storage facilities. Quick and efficient retrieval of the information so stored has presented many challenges because of the very small energy levels involved. Ferroelectric-photoconductor, photoelectret and other materials have been used for such storage techniques. Perhaps the best known material is the photoelectret material which stores the information by persistent internal polarization.

Persistent internal polarization (PIP) is the phenomenon in which a persistent internal electric field is produced in a photoconductive dielectric material which is subjected to irradiation and an external electric field applied by suitable electrodes. The internal polarization or electric field persists in the pattern established by the incident radiation on the dielectric even after the external electric field and irradiation have been removed, and even though the electrodes are shorted; it can be deenergized by subsequent irradiation.

The PIP phenomenon may be explained in terms of carrier migration in the structure of the photoconductive PIP dielectric material; this material is also referred to as photoelectret material or simply a photoelectret. A typical photoelectret may be formed using zinc sulfide or zinc-cadmium sulfide as the host photoconductor, and which may have silver or copper or other materials as impurities. Such a photoelectret would have an energy level structure including a valence band and a higher energy conduction band, and there would be a plurality of other levels, generated by the impurities or other anomolies, which are referred to as traps because they are envisioned as "trapping" migratory holes or electrons, i.e. free carriers.

Irradiating the photoelectret with sufficient energy to lift the electrons from the valence to the conduction level causes electron-hole pairs to be formed. If an external electric field is applied to the photoelectret in this condition, electrons and holes will move under the influence of the field. Some of these are caught in the impurity levels or traps and will remain trapped when the irradiation ceases, while untrapped electrons and holes recombine.

The trapped electrons and holes result in an electric field or polarization within the photoelectret which cannot be removed by shorting or grounding the electrodes, but may be removed by irradiating the photoelectret a second time. The second irradiation raises the electrons and/or holes from the traps, causing them to move in the conduction and/or valence band until they recombine or reach the electrodes.

During the application of the external electric field, the polarizing continues until the polarization voltage at the electrodes of the photoelectret equals the applied voltage. In this state there are two types of charges on the electodes: a capacitive charge, present upon the polarizing of any dielectric; and a "bound" charge associated with the PIP field, so called because the charges are bound in their immobile condition by the PIP field. The capacitive charge is not desirable and should be removed before any read-out is undertaken to prevent confusion of it with the bound charge which provides free carriers in proportion to the PIP of the photoelectret when it is irradiated. Presently, measures of the charge produced at the electrodes when the bound charges are released upon irradiation are used to ascertain the amount of PIP of a photoelectret. If the irradiation is performed with a spot of radiation which is swept across the photoelectret in a definite pattern the charges sensed from the photoelectret may be applied to reconstruct the information or image stored in the photoelectret in much the same manner as with charges sensed in a vidicon or other image tube.

Since this phenomenon was first observed many attempts have been made to apply it to the broad field of information storage and retrieval and to the specific area of photography or electrophotography. One proposal involved the dusting of the polarized areas with charged carbon particles to produce a visible reproduction of the image information. Another proposal involved connecting the output of the PIP dielectric to modulate the intensity of the beam of a cathode ray tube in accordance with the release of the bound charges by the illumination from a second cathode ray tube which is imaged on the photoelectret and whose scanning beam is synchronized to operate with the first cathode ray tube so that a video reproduction of the PIP stored image is produced on the first cathode ray tube. "Bound" charges are those which are bound by the electric field resulting from the PIP.

Some of these techniques met with indifferent success because of the low signal-to-noise ratio of the electrical signals produced by release of the bound charges upon the application of radiation. The low signal-to-noise ratio is due in part to the small signal voltages obtained upon release of the bound charges in comparison to the thermal or other noise originating in the photoelectret and/or the amplifier so that information retrieval is incomplete and/or incorrect. The small signal voltages result because the bound charges released by irradiation immediately distribute themselves over the entire capacitance formed by the electrodes and PIP material reducing the available signal proportionally.

SUMMARY OF THE INVENTION

Thus it is desirable to have available a technique for optically reading out information stored by means of an internal electric field in a semi-conductor medium by applying that electric field to an electro-optic medium and sensing the effect of the field on radiation transmitted by the electro-optic medium.

It is also desirable to have available such a technique which may be applied to read out information stored in a photoelectret.

It is also desirable to have available such a technique using an electro-optic medium that exhibits induced birefringence and may be employed to provide elliptically polarized radiation whose eccentricity is a measure of the internal electric field of the semi-conductor.

The invention may be accomplished by information retrieval apparatus for reading out information stored in the form of a pattern in a semi-conductor medium by means of an internal electric field comprising an electro-optic medium, exhibiting a characteristic that varies with variations of an applied electric field, associated with the semi-conductor medium for modulating as a function of the internal electric field of the semi-conductor medium, radiation transmitted by the electro-optic medium, means for exposing the electro-optic medium to radiation, and means for detecting the modulation of the radiation, imposed by the electro-optic medium, representative of the information pattern stored in the semi-conductor medium.

DISCLOSURE OF SPECIFIC EMBODIMENTS

Other objects, features and advantages will appear from the following description of preferred embodiments of the invention, and the accompanying drawings, in which.

In a specific embodiment a semi-conductor medium such as a photoelectret with information stored in it is combined with an electro-optical medium which may be a material which exhibits induced birefringence that is variable in accordance with an electric field applied to the material. The combination may be effected by two separate materials formed as adjacent layers or by one material which exhibits both the photoelectret and electro-optic characteristics. The electric field resulting from the persistent internal polarization is distributed in a pattern corresponding to the pattern of the information stored in the photoelectret. The electro-optic material may be one that exhibits induced birefringence which varies as the associated electric field of the photoelectret, thus variations of the birefringence establish a pattern corresponding to the pattern of the information stored in the photoelectret.

A laser projects plane polarized light along the induced birefringent axes of the electro-optic material of a wavelength to which the photoelectret, electro-optic material and any electrodes are transparent. As the plane polarized light is scanned across the combination of photoelectret and electro-optic material, it is transformed by the electro-optic material into elliptically polarized light whose elliptical eccentricity is a function of the applied field at that particular point.

The response of the electro-optic material to the electric field of the photoelectret may be detected by selecting a component or components of the polarized light which varies as a function of the applied field. In some cases the magnitude of that component or components may also be measured. An analyzer which passes light only in the plane perpendicular to the plane of polarization of the input light from the laser filters the elliptically polarized output light transmitted by the birefringent material. The selected light transmitted by analyzer is therefore a serial representation of the birefringence pattern produced by the electric field established by the persistent internal polarization created in the photoelectret by the information pattern stored there.

It should be understood that the terms "polarize" and "polarization" are commonly used to refer to two different physical characteristics, both of which are applied here. In one sense polarize is used to refer to direction of current flow or orientation of an electric field. This is the sense meant when used in reference to the persistent internal polarization of a photoelectret. In another sense polarize is used to refer to the vibration of radiant waves in a definite pattern. And this is its sense when used in reference to plane or elliptically polarized radiation or light.

Figure 1:
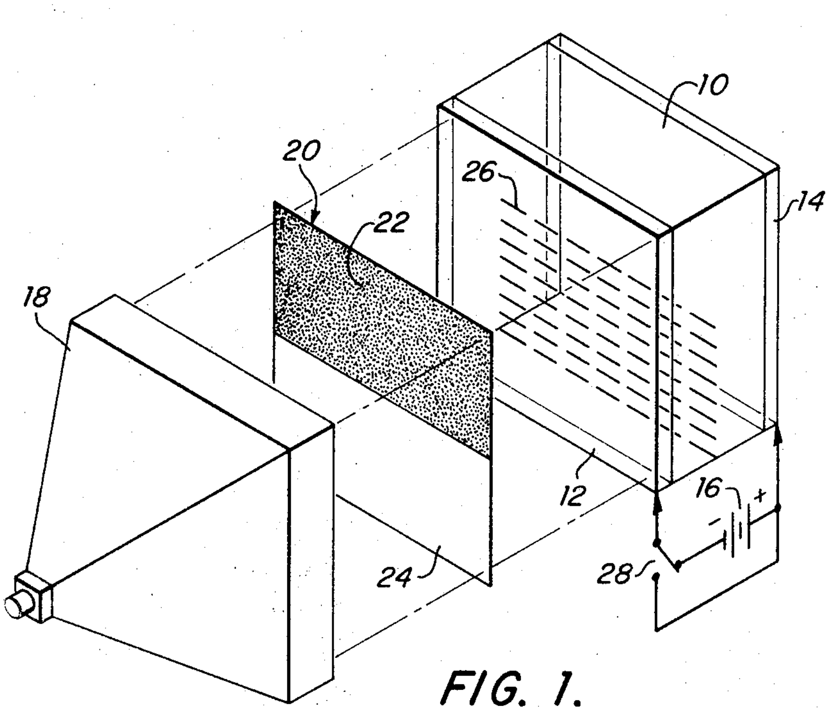
FIG. 1 is a diagram in perspective of a typical arrangement for storing a pattern of information in a photoelectret.

Information in the form of an image or pattern may be stored in a photoelectret 10 having a voltage applied across its electrodes 12 and 14 by battery 16, FIG. 1. Collimated radiant energy to which electrodes 12 and 14 and photoelectret 10 are transparent is supplied by source 18 which may produce infra-red, ultraviolet, visible light, or other radiation is directed through a transparency 20 to photoelectret 10. The dense portion 22 of transparency 20 blocks the radiation; the less dense portion 24 transmits the radiation and produces persistent internal polarization (PIP) in a corresponding image or pattern in photoelectret 10, as indicated by dashes 26.

Figure 2:
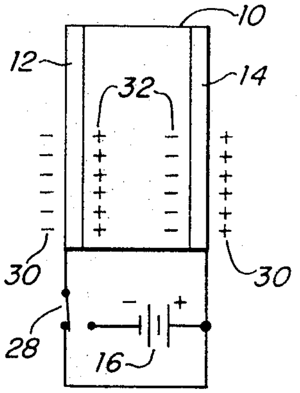
FIG. 2 is a schematic side view of the photoelectret of FIG. 1 showing the pattern of information stored in it by persistent internal polarization.

The radiation and voltage are removed and the surface capacitive charge is discharged by switch 28 in the shorting position as shown in FIG. 2.

The bound charges 30 at the surfaces of the photoelectret 10 are of the same polarity as their respective terminals of battery 16 and the PIP charges 32 are of opposite polarity. And as may be clearly seen in FIG. 2 the PIP occurs in the areas where the exposing light was incident on the photoelectret. The transparency here is divided into equal high density and low density portions for clarity only, as transparencies or patterns having high and low density portions interspersed over the entire area may also be stored and are more commonly the type of information patterns stored.

A second type of material referred to in this description includes electro-optic crystals. Certain types of crystals when exposed to an electric field undergo changes in their optical properties. This electro-optic effect may be maximized when the electric field and the direction of the light through the crystals are optimized. Polarized light transmitted through such crystals forms components along the X and along the Y axes and the velocity of the light along those axes is a function of the electric field. Hence the X and Y axes exhibit different indices of refraction, a characteristic referred to as birefringence. Because of the dissimilar velocities that the light components experience along the X and Y axes, these orthogonal components are phase shifted relative to each other as they pass along these paths.

In such crystals the birefringence, thus the relative phase shift, is a function of the thickness of the crystal along the direction of travel of the radiation through the crystal and the strength of the applied electric field; if the applied field is zero, no birefringence is exhibited. One such device in which the birefringence varies linearly with respect to an electric field is referred to as a Pockel's device. A similar optical effect is exhibited by another type of crystal without application of an electric field. With such crystals the relative phase shift or retardation between the components along each axis is determined by the thickness of the crystal.

When in either type of crystal plane polarized light is applied, the relative phase shift between the orthogonal components parallel to the fast and slow axes results in elliptically polarized light, the elliptical eccentricity being a function of the magnitude of relative phase shift or retardation introduced by the electro-optic material. Analysis of this elliptically polarized light by a polarizer material produces light whose intensity is a function of the ellipticity of, thus the birefringence of, the crystal. In cases where the electro-optical crystal is used the intensity of the light from the polarizer is also a function of the electric field applied to the crystal.

Figure 3:
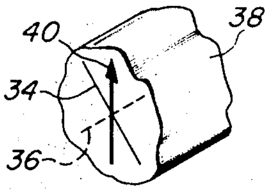
FIG. 3 is a perspective view of a crystallite exhibiting a birefringent effect.
Figure 5:
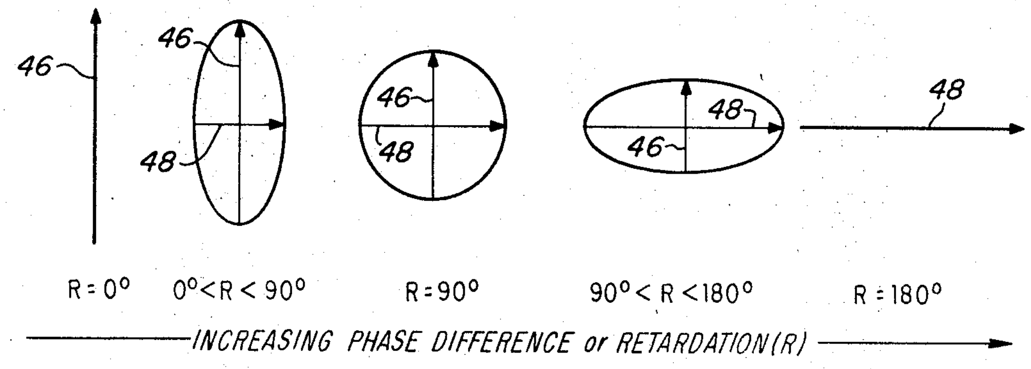
FIG. 5 is a representation of the varying elliptical field produced by the relative retardation introduced between the waves.

A particle or crystallite 38, FIG. 3, of a typical birefringent material is shown having a fast axis 34 and a slow axis 36 named for the relative velocity of light through them. The variation of the eccentricity of the elliptical field produced by an electro-optic material such as crystallite 38 exposed to plane polarized radiation, vetcor 40, bisecting its slow and fast axes is shown in FIG. 5. At 0° retardation ($R=0°$) this elliptical field takes the form of a straight line equivalent to its major axis 46, i.e. a special case of an ellipse, which bisects the right angle between the slow and fast axes. In the case where the slow and fast axes are oriented as shown in FIG. 3, the straight line is vertical as shown in the $R=0°$ position in FIG. 5. As the retardation increases from 0° the field takes the form of a recognizable ellipse. As the retardation increases from 0° to 90° the major axis 46 of the ellipse becomes shorter while the minor axis 48 becomes longer, causing a decrease in the eccentricity of the ellipse. At 90° retardation shown at the $R=90°$ position in FIG. 5 the major axis 46 and minor axis 48 are equal in length, i.e. the ellipse becomes a circle.

Between 90° and 180° as shown in the $90° \leq R \leq 180°$ position of FIG. 5 the major axis 46 lengthens while the minor axis 48 shortens causing an increase in eccentricity of the ellipse. At 180° retardation as shown in the $R=180°$ position of FIG. 5 the ellipse has degenerated into a horizontal line equivalent to its minor axis 48.

Figure 4:
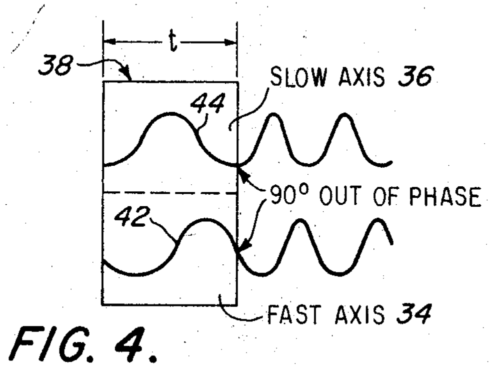
FIG. 4 is a representation of the relative retardation introduced between the two radiant waves by a birefringent material.

It is apparent, then, that if the crystallite 38 is formed with a thickness $t$ calculated to produce a relative retardation or phase difference between the radiation wave 42, FIG. 4, traveling along the fast axis 34 and the radiation wave 44 traveling along the slow axis 36, of 90° ($\pi/2$) or a quarter wavelength ($\lambda/4$), FIG. 4, the output radiation from crystallite 38 will be circularly polarized.

If the thickness $t$ is decreased from the dimension which provides a quarter wavelength ($\lambda/4$) retardation waves 42 and 44 will emerge sooner and their relative retardation will be decreased. As the relative retardation decreases the major axis 46, the component of output radiation parallel to the plane of polarization of the input radiation, vector 40, increases and the minor axis 48, the component perpendicular to the input radiation decreases, FIG. 5, until at zero thickness there is zero retardation or phase difference and there is no perpendicular component, only the parallel component, which is equal to the vertically polarized input radiation indicated at FIG. 5. Similarly, if thickness $t$ is increased from the dimension which provides a quarter wavelength ($\lambda/4$) retardation, waves 42 and 44 will emerge later and their relative retardation will be increased. As the relative retardation increases the parallel component decreases and the perpendicular component increases until $t$ reaches the dimension at which the retardation is 180° where only the perpendicular component exists. At 180° retardation the perpendicular component is equal to the input radiation but perpendicular to it as represented at the $R=180°$ position of FIG. 5.

An element which provides a 90° phase shift or retardation is often referred to as a quarter wave plate and an element which provides 180° phase shift or retardation is often referred to as a half wave plate. A half wave plate rotates the input radiation field 90° as can be seen by comparing the vectors at the 0° and 180° positions depicted in FIG. 5.

Figure 6:
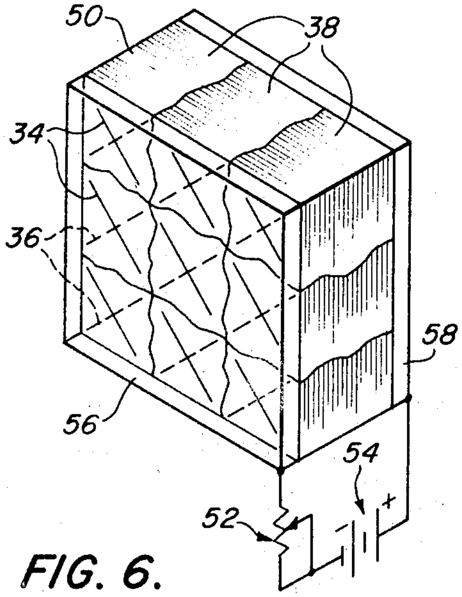
FIG. 6 is a schematic perspective view of an electro-optic material, known as a Pockel's device, which exhibits variation in birefringence with variation in an applied electric field.

The same phase shifting or retardation effects on the radiation passing along the slow and fast axes produced by varying the thickness $t$, discussed with reference to FIGS. 4 and 5, may be produced in a Pockel's device having a constant thickness $t$ by varying the applied voltage across the Pockel's device 50 as for example by means of a potentiometer 52 connected in line with battery 54 across electrodes 56 and 58. A Pockel's device 50 includes many crystallites 38 each of which exhibits birefringence along slow 36 and fast 34 axes. The device 50 may be fabricated or grown so that all slow axes 36 are aligned in the same direction and all fast axes 34 are aligned in the same direction, the slow and fast axes being mutually perpendicular. Pockel's device 50, FIG. 6, has a uniform field across it provided by battery 54 through electrodes 56 and 58, so each crystallite 38 exhibits the same retardation; and radiation entering at every point on the surface of device 50 will emerge elliptically polarized to the same degree. If the field is nonuniform on device 50, the elliptical polarization of the radiation will vary in correspondence with the field.

Figure 7:
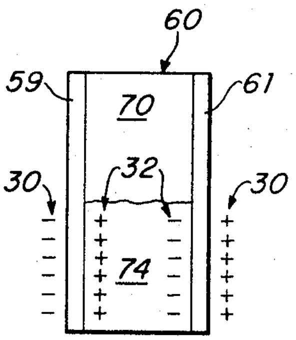
FIG. 7 is a schematic side of an element which is both a photoelectret and a linear electro-optic device showing a persistent internal polarization similar to that of the photoelectret in FIG. 2.

If a Pockel's device also exhibits persistent internal polarization, i.e. if the same material is both a linear electro-optical material and a photoelectret material, for example cubic zinc sulfide (ZnS), it will exhibit birefringence which varies with variations in the electric field resulting from the persistent internal polarization established by the pattern of radiant information stored in the material. The result is an element 60, having electrodes 59 and 61, which exhibits birefringence in a pattern corresponding to the pattern of information stored in it by persistent internal polarization. In such an element 60, FIG. 7, having the same pattern stored in it as stored in photoelectret 10, FIGS. 1 and 2, the crystallites in the upper area 70 of element 60 corresponding to the dense portion 22 of transparency 20, have negligible or no field across them and will exhibit little or no birefringence, whereas the crystallites in lower area 74 of element 60 corresponding to the less dense portion 24 of transparency 20 are subject to the field created by the bound charges 30 and the trapped PIP charges 32, FIGS. 2 and 7.

Figure 8:
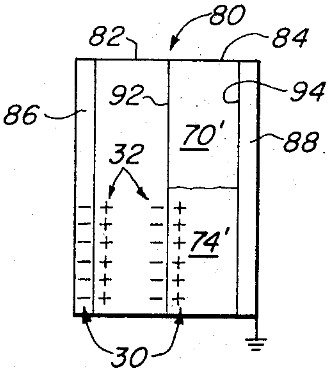
FIG. 8 is a schematic side view of a photoelectret similar to that of FIG. 2 combined with a Pockel's device similar to that of FIG. 6.

Instead of using an element which exhibits both the internal electric field capability of a semi-conductor and electro-optic effects in one material, a layered element 80, FIG. 8, may be made by combining, for example, a photoelectret 82 with a Pockel's device 84 between electrodes 86, 88. The Pockel's device may be formed of potassium dihydrogen orthophosphate (KDP) and the photoelectret of hexogonal zinc sulfide whose unoriented crystallites make it an inefficient linear electro-optic medium. The PIP in photoelectret 82 is similar to that in FIGS. 1, 2 and 7 and the bound charges 30 and the PIP charge 32 establish a field across Pockel's device 84 between common face 92 of Pockel's device 84 and face 94 adjacent electrode 88. The crystallites in upper area 70' thus have little or no field across them and exhibit little or no birefringence, whereas the crystallites in the lower area 74' have a substantial field across them and exhibit substantial birefringence.

Figure 9:
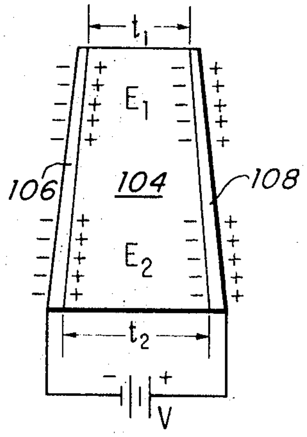
FIG. 9 is a schematic side view of an element similar to that in FIG. 7 but having non-uniform thickness.

An advantage of using a semi-conductor medium and electro-optic medium combination for reading out the information in the semi-conductor medium, whether it be a single material exhibiting both effects or two materials each exhibiting one of the effects, is that its thickness need not be uniform. This is so because the birefringence is a function of the applied field which is a function of the applied voltage and the thickness. To illustrate, a voltage V applied across electrodes 106, 108, FIG. 9, creates a field $E_1$ across thickness $t_1$ of element 104, but a lesser field $E_2$ across greater thickness $t_2$. Field $E_2$ being less than field $E_1$ will produce in crystallites subject to it less birefringence than will be produced by field $E_1$. But the radiation passing through element 104 in the crystallites subject to lesser field $E_2$ must pass through greater thickness $t_2$, so the overall retardation or phase shift is uniform whether or not the thickness is uniform in such devices.

Figure 10:
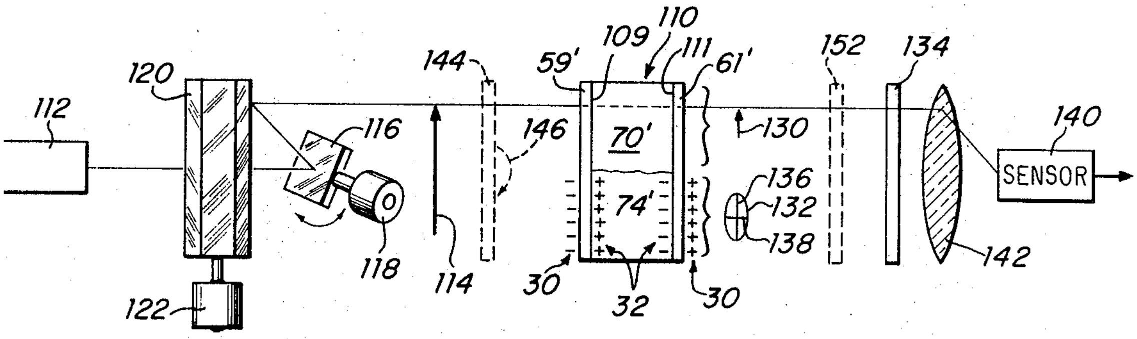
FIG. 10 is a diagrammatic view of an arrangement of apparatus according to this invention employing serial read-out techniques and utilizing one component of the elliptically polarized output radiation.

An embodiment of information retrieval apparatus according to this invention using an element 110 having electrodes 59' and 61' and containing photoelectret-Pockel's material is shown in FIG. 10. An information pattern similar to that of FIGS. 1 and 2 is stored in element 110 as evidenced by PIP charges 32 and bound charges 30. A source of plane polarized light such as laser 112 provides a beam of light plane polarized as shown by vector 114. The laser beam is projected onto mirror 116 which is oscillated by motor 118 to sweep the beam up and down on the six-sided mirror prism 120 which is continuously rotated by motor 122. The beam incident on prism 120 from mirror 116 is therefore swept from side to side across element 110 while also being swept up and down. As a result a raster is produced similar to the type used in various other imaging tubes.

As the plane polarized beam sweeps over the surface of element 110 the light from the beam emerges from the other surface 111 elliptically polarized to a degree controlled by the birefringence of, thus, the PIP in, element 110. If the slow axes of the crystallites are parallel, the fast axes of the crystallites are parallel, and the plane polarized input light, vector 114 is vertically oriented and bisects the angle of intersection of the fast and slow axes, the polarization of the output light emerging from element 110 will be represented by a vertical line when there is no field and no birefringence, a vertically elongated ellipse when there is some field and some birefiringence, a circle when the field provides a birefringence that establishes a 90° phase difference or retardation, a horizontally elongated ellipse when there is a field which produces a birefringence that establishes more than a 90° retardation, and a horizontal line when the field produces birefringence that establishes a 180° retardation, see FIG. 5.

Assuming that there is no field at area 70' the light emerging from that area will be plane polarized 130 in the direction of vector 114. And assuming that there is enough field at area 74' to provide some retardation but not 90° or more retardation, the light emerging from that area will be elliptically polarized 132 in the form of a vertically elongated ellipse.

The effect of the electric field of the photoelectret on the birefringence of the electro-optic material may be detected by selecting a component of the polarized light and sensing its magnitude.

For example, an analyzer in the path of the output light, such as plane polarizing section 134 may be oriented to block light which is polarized as is the input light vector 114, and pass light perpendicular to the input light. Thus the output light polarized as 130 would be blocked, as would the vertical component 136 of elliptically polarized light 132. But the horizontal component 138 of elliptically polarized light 132 would be passed and focused at sensor 140 by lens 142. The magnitude of the signal received by sensor 140 at any time is, then, a function of the birefringence of the particular point on element 110 being irradiated at that time. In this manner the birefringence induced by the PIP element 110 may be utilized to read out the pattern of information stored in element 110. Plane polarizing section 134 may be oriented to detect only light polarized as the input light, vector 114, and exclude light polarized as component 138. In that case the output received by sensor 140 will be a negative of the stored pattern. The output of sensor 140 may be delivered to magnetic tape, imaging tubes, or various other recording media for storage, reproduction or transmission in serial form or may be reconstructed by a similar raster movement to reproduce the original pattern or a negative thereof.

Alternatively in the embodiment of FIG. 10 a quarter wave plate 144 may be positioned between laser 112 and element 110 to convert the plane polarized light, vector 114, from laser 112 into elliptically polarized light. A quarter wave plate made from a birefringent material may be sized to provide a 90° phase shift or retardation between its slow and fast axes, see discussion of FIGS. 3, 4, and 5. By orienting plate 144 so that vector 114 bisects the angle formed by its fast and slow axes, circularly polarized light is obtained, vector 146. Circularly polarized light may be represented by a field vector which is constantly rotating so that the direction of the vector is constantly changing. When circularly polarized light is used to scan element 110 the light emerging from area 70', where there is no field and no birefringence, is still circularly polarized, whereas that which emerges from area 74', where there is a field and there is birefringence, has been distorted into some other elliptical form. And again section 134 may be used to pass and block various components of the elliptical field as previously explained.

One advantage which derives from using circularly polarized input light is a result of the rotation of the field which provides polarized light of constantly changing direction. Thus Pockel's devices in which the slow and fast axes of each crystallite are misaligned with respect to those axes in every other crystallite in the device may be used in the apparatus: the rotating field produces output light from such a device which is independent of any misalignment of the crystallites. That is, it will produce an output as if all crystallites were properly aligned with each other and correctly oriented with respect to plane polarized input light. Unless the Pockel's device was carefully produced the axes of the individual crystallites will not be uniformly aligned.

Figure 11:
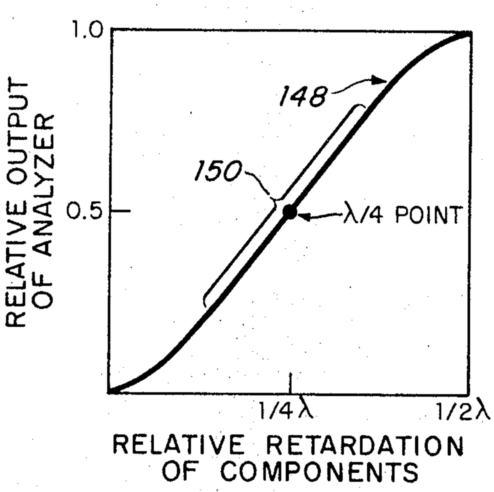
FIG. 11 is a transfer characteristic of an analyzer which may be used in this invention.

A second advantage of using circularly polarized light, i.e. light formed by two light rays 90° out of phase, derives from the nature of the analyzers, section 134, used. The transfer characteristic 148, FIG. 11, of a typical analyzer representing the variation in output with variations of retardation shows that the output of the analyzer increases non-linearly with increase in retardation below and above region 150 proximate the ($\lambda/4$) one quarter wavelength retardation point. Proximate region 150 small changes in analyzer output are essentially linear with changes in retardation. By using circularly polarized light the whole system is biased to operate at a quiescent point of $\lambda/4$; small excursions in either direction from that point, increasing or decreasing retardation, caused by birefringence in element 110 will thus be within the linear region of operation.

Whether element 110 causes an advance, i.e. lessening of retardation, or an increase of retardation of the light passing through it depends on the polarity of the applied electric field. The fast and slow axes established by one field become the slow and fast axes, respectively, established by a field of opposite polarity.

In another alternative arrangement a second quarter wave plate 152 is interposed between element 110 and section 134. However this plate 152 is placed so that the positions of its slow and fast axes are interchanged relative to the positions of those respective axes in plate 144. The result is that light which passed along the slow axis of plate 144 and which was retarded by 90° relative to the light passing along the fast axis, is now passed along the fast axis and will be advanced 90°. Thus plate 152 is made to completely compensate for the action of plate 144 and the light reaching section 134 will, as a result, be elliptically polarized light derived solely from the birefringence of element 110. Section 134 may be used to derive negative or positive information as previously explained and the use of lens 142 and detector 140 is likewise similar to their use in the other alternative arrangements.

Figure 12:
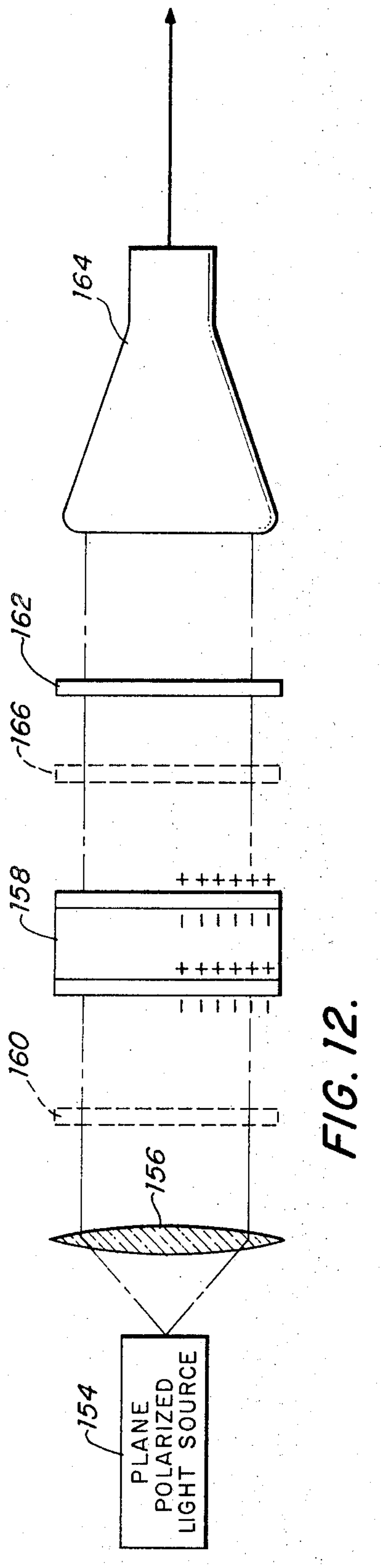
FIG. 12 is a diagrammatic view of another arrangement of apparatus according to this invention utilizing parallel read-out techniques.

The invention may be accomplished using a parallel read-out technique as well as a serial read-out technique which results from the narrow beam scanning arrangement, FIG. 10. Such a parallel read-out apparatus is shown in FIG. 12 where a plane polarized light source 154 whose light is collimated by lens 156 and projected onto photoelectret-Pockel's element 158 simultaneously bathes every part of the surface of the element in the light. A quarter wave plate 160 may be interposed between lens 156 and element 158 or between source 154 and lens 156 for purposes previously explained herein. The elliptically polarized output light emerging from element 158 passes through an analyzer which again may be a plane polarizing section 162 and a selected component of the elliptical field is passed to the recording medium, in this instance an image storage tube 164 which may be read out serially. Many other recording media, permanent (film) and temporary, may be used to receive the parallel read-out. Again a quarter wave plate 166 may be employed between element 158 and section 162.

Figure 13:
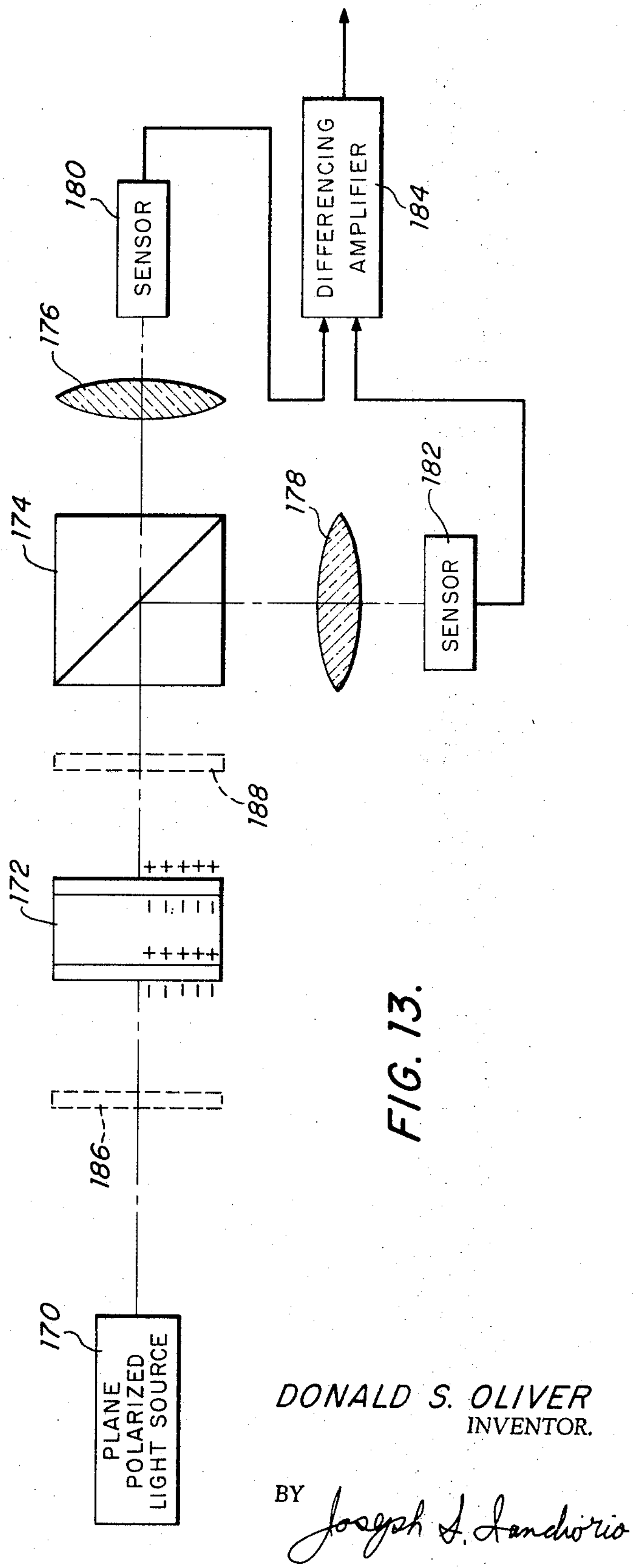
FIG. 13 is a diagrammatic view of another arrangement of apparatus according to this invention utilizing two components of the elliptically polarized output radiation.

Another embodiment of the invention in which both the parallel and perpendicular components of the elliptically polarized light are utilized is shown in FIG. 13. A plane polarized light source 170, which may be made to scan as laser 112 in FIG. 10, shines a narrow beam of light through photoelectret-Pockel's element 172. The elliptically polarized output light from element 172 is resolved into two perpendicular components, vertical and horizontal in this case, and directed in two different directions by a crystal 174, for example, a Glan-Thompson, Rochon or Glan crystal. A pair of lenses 176, 178 individually focus the respective components onto separate sensors 180, 182 and the electrical output of those sensors is submitted to a differencing amplifier 184 whose output represents the light-dark pattern of the information stored in element 172. Quarter wave plates 186, 188 may also be used. An advantage of this arrangement is that it eliminates any errors introduced by factors which affect both axes of the electro-optic materials such as fluctuations in the output of the light source.

The invention is not limited only to electro-optic material exhibiting induced birefringence, for many other types of electro-optic materials exhibiting various other characteristics may be used. Nor is it limited to use with photoelectrets for it may as well be used to retrieve information stored by means of an internal electric field in many other semi-conductor mediums such as for example ferroelectric materials.

Many types of polarized light sources producing plane or some form of elliptically polarized radiation may be used; various types of radiation-sensitive media may be used to sense the radiation; and various arrangements of parts may be used to accomplish serial and parallel read-outs according to this invention. The radiation provided is not limited to visible light but may as well be ultraviolet, infra-red, X-ray, or any other type of electromagnetic radiation capable of producing the desired result. If radiation is used to which the element is transparent but which does not supply sufficient energy to release the PIP, non-destrictive read-out may be effected.

What is claimed is:

1. Information storage and retrieval apparatus comprising:

(a) a semi-conductor medium which stores therein information in the form of a pattern by means of a persistent internal electric field;

(b) an electro-optic medium, exhibiting an optical property that varies with variations of an applied electric field, for modulating as a function of the persistent internal electric field of said semi-conductor medium radiation transmitted by said electro-optic medium, said electro-optic medium being associated with said semi-conductor medium, (c) means for exposing said electro-optic medium to radiation; and (d) means for detecting the modulation of said radiation imposed by said electro-optic medium, said modulated radiation being representative of an information pattern stored in said semi-conductor medium.

2. The apparatus of claim 1 in which said semi-conductor medium is a photoelectret material.

3. The apparatus of claim 1 in which said electro-optic medium is a material whose birefringence varies as a function of an applied electric field.

4. The apparatus of claim 1 in which said electro-optic medium and said semi-conductor medium are included in a single material which exhibits the characteristics of both mediums.

5. The apparatus of claim 1 in which said electro-optic medium and said semi-conductor medium are two separate materials each exhibiting the characteristics of a different one of the mediums.

6. The apparatus of claim 3 in which said means for exposing includes means for irradiating said material with polarized input radiation.

7. The apparatus of claim 6 in which said material modulates said polarized input radiation transmitted through it to produce elliptically polarized output radiation whose eccentricity varies with variations in the applied electric field.

8. The apparatus of claim 7 in which said means for detecting includes analyzing means for selecting at least one component of said elliptically polarized output radiation representative of the variations of the internal electric field of said semi-conductor medium applied to said material.

9. The apparatus of claim 6 in which said means for irradiating includes a source of plane polarized input radiation.

10. The apparatus of claim 6 in which said means for irradiating includes a source of circularly polarized input radiation.

11. The apparatus of claim 8 in which said analyzing means includes a circular analyzer.

12. The apparatus of claim 8 in which said analyzing means includes a plane analyzer.

13. The apparatus of claim 8 in which said analyzing means includes means for selecting two mutually perpendicular components from the elliptically polarized output radiation.

14. The apparatus of claim 1 in which said means for exposing said electro-optic medium includes a source of radition in the visible range.

15. The apparatus of claim 1 in which said means for exposing said electro-optic medium includes a source of radiation below the energy level which may dissipate the internal electric field of said semi-conductor for effecting non-destructive read out of it.

16. The apparatus of claim 1 in which said means for detecting includes means for sensing the magnitude of the modulation of the output radiation from said electro-optic medium.

17. An information storage and retrieval method comprising:

(a) storing information in the form of a pattern in a semi-conductor medium by means of a persistent internal electric field;

(b) exposing to radiation an electro-optic medium exhibiting an optical property that varies with variations of an applied electric field, said electro-optic medium being associated with said semi-conductor medium to enable said electro-optic medium to modulate radiation transmitted by it as a function of the persistent internal electric field of said semi-conductor medium; and, (c) detecting the modulation of the radiation imposed by said electro-optic medium, said modulated radiation being representative of an information pattern stored in said semiconductor medium.

18. The method of claim 17 in which said semiconductor medium is a photoelectret material.

19. The method of claim 17 in which said electro-optic medium is a material whose birefringence varies as a function of an applied electric field.

20. The method of claim 17 in which said electro-optic medium and said semi-conductor medium are included in a single material which exhibits the characteristics of both mediums.

21. The method of claim 17 in which said electro-optic medium and said semi-conductor medium are two separate materials each exhibiting the characteristics of a different one of the mediums.

22. The method of claim 19 in which said material is exposed to polarized input radiation.

23. The method of claim 22 in which said material modulates said polarized input radiation transmitted through it to produce eliptically polarized output radiation whose eccentricity varies with variations in the applied electric field.

24. The method of claim 23 in which detecting includes selecting at least one component of the elliptically polarized output radiation representative of the variations of the internal electric field of the said semi-conductor medium applied to said material.

25. The method of claim 22 in which the exposing polarized input radiation is plane polarized.

26. The method of claim 22 in which the exposing polarized input radiation is circularly polarized.

27. The method of claim 17 in which the exposing is performed with radiation below the energy level which may dissipate the internal electric field of said semi-conductor for effecting non-destructive read-out of it.

References Cited

UNITED STATES PATENTS

| | | | |
|---|---|---|---|
| 3,445,826 | 5/1969 | Myers. | |
| 3,448,282 | 6/1969 | Fleisher et al. | |
| 3,449,583 | 6/1969 | Eden. | |
| 3,383,664 | 5/1968 | Chen et al. | 350—150 X |
| 3,430,212 | 2/1969 | Max et al. | 350—150 X |

OTHER REFERENCES

Fleisher et al., "Radiation Controlled Radiation Gate," IBM Technical Disclosure Bulletin, vol. 6, No. 3, August 1963, pp. 73–74.

McDonnell, "Optical Sweep and Recording System," IBM Technical Disclosure Bulletin, vol. 9, No. 8, January 1967, pp. 1002–1003.

DAVID H. RUBIN, Primary Examiner

P. R. MILLER, Assistant Examiner

U.S. Cl. X.R.

340—173, 173.2; 350—150, 157, 160